UNITED STATES PATENT OFFICE.

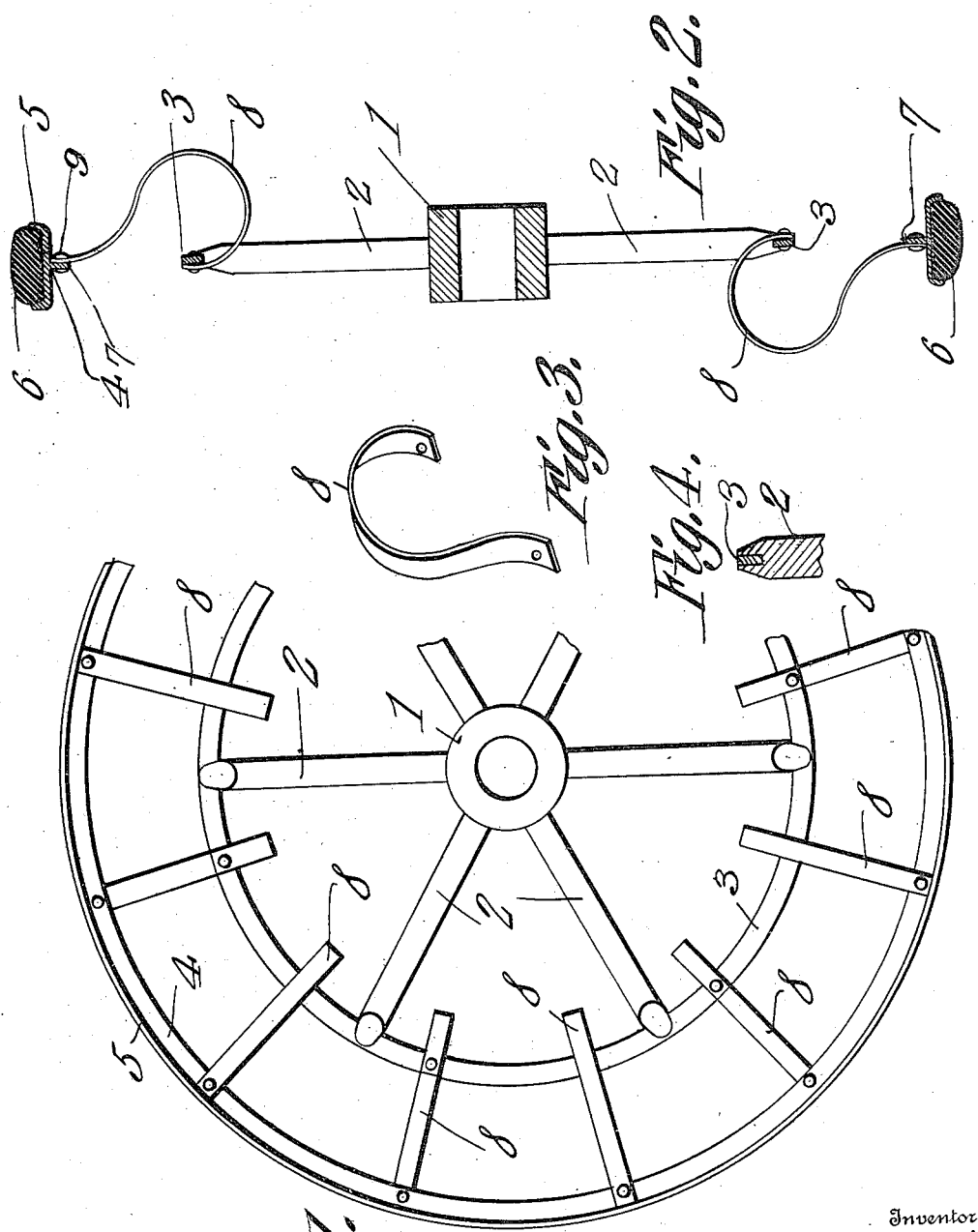

JESSE A. LANDIS, OF DAYTON, OHIO.

WHEEL.

987,891.  Specification of Letters Patent.  Patented Mar. 28, 1911.

Application filed August 21, 1909. Serial No. 513,984.

*To all whom it may concern:*

Be it known that I, JESSE A. LANDIS, a citizen of the United States, residing at Dayton, in the county of Montgomery and State of Ohio, have invented a new and useful Wheel, of which the following is a specification.

This invention relates to new and useful improvements in spring wheels and is designed as a substitute for the pneumatic tire now extensively used.

It contemplates the construction of a wheel of this type and character that will operate as noiselessly as a pneumatic tire and will have all of the resilient qualities thereof, but will overcome the necessity of frequent repairs.

With the above and other objects in view, this invention consists in the construction, combination and arrangement of parts, all as hereinafter more fully described, specifically claimed and illustrated in the accompanying drawings wherein, Figure 1 is a side elevation of a portion of a wheel constructed after my improved method. Fig. 2 is a central longitudinal section thereof. Fig. 3 is a perspective view of one of the springs. Fig. 4 is an enlarged detail sectional view of the end of a spoke and the band.

Reference being had to the drawings, 1 indicates in general the nave or hub having the spokes 2 radiating therefrom. Countersunk in the outer terminals of the spokes is the inner ring or band 3 toward which the outer terminals of the spokes are beveled.

Concentrically disposed around the band 3 is the outer band or felly 4 having side flanges 5 engaging the tire 6, and on its inner face an annular rib 7 standing in the plane of the band 3. Connecting said rib and band is a series of leaf springs 8, the series comprising twice as many springs as there are spokes so that two of the springs shall be disposed between each two spokes as illustrated. Each spring is riveted as at 9 to one side of the rib 7, from which point it curves laterally out of the plane of the wheel and extends inward toward the hub, thence passes around under the band 3, and is finally riveted to the face of the band opposite that of the rib to which its other end is attached; and the next spring in order around the wheel is given the opposite arrangement so that it is secured to the other side faces of the rib and band and projects to the other side of said plane. It follows, therefore, that between each two spokes there are two of said springs, one projecting to either side of the wheel. All the springs stand edgewise parallel to the plane of the wheel so that if power be applied to the hub of the latter it is communicated edgewise through the springs to the rim rather than flatwise of them which would tend to permit the hub to turn within the rim; yet this disposition of springs permits the hub to yield toward the rim or vice versa as occasion requires, and it permits the rim to flex laterally a little out of the plane of the hub and its spokes as occasion requires.

What is claimed as new is:

1. In a wheel, the combination of a hub, spokes radiating therefrom, a band carried by the outer ends of the spokes, a felly, and a series of radial springs each secured at one end to the felly and at the other end to the band and curved between its ends so as to project into the space within the band, there being a plurality of springs disposed between each two spokes.

2. In a wheel, the combination of a hub, spokes radiating from the hub, a band countersunk in the ends of said spokes, a felly having an annular rib on its inner side, and a series of radially disposed leaf springs each secured to one face of said rib, curved laterally outward therefrom around and within the band, and secured to the opposite face of said band, the curves of adjacent springs extending alternately to opposite sides of the plane of the wheel.

In testimony that I claim the foregoing as my own, I have hereto affixed my signature in the presence of two witnesses.

JESSE A. LANDIS.

Witnesses:
 C. A. GREEN,
 H. H. GREEN.

Copies of this patent may be obtained for five cents each, by addressing the "Commissioner of Patents, Washington, D. C."